United States Patent [19]

Freller

[11] 4,103,462
[45] Aug. 1, 1978

[54] MOBILE HOME

[75] Inventor: Walter Freller, Sierning, Austria

[73] Assignee: "Wohn-Art" - Freizeitartikel Gesellschaft m.b.H., Windischgarsten, Austria

[21] Appl. No.: 793,748

[22] Filed: May 4, 1977

[30] Foreign Application Priority Data

May 5, 1976 [AT] Austria .................................. 3301/76
Nov. 8, 1976 [AT] Austria .................................. 8279/76

[51] Int. Cl.² .......................... E04B 1/346; E04B 7/16
[52] U.S. Cl. ............................................ 52/67; 52/69; 52/143; 296/23 C; 296/23 G
[58] Field of Search ................. 52/67, 71, 69, 64, 143; 296/23 C, 26, 23 F, 23 G

[56] References Cited

U.S. PATENT DOCUMENTS

| 2,606,057 | 8/1952 | Johnson | 52/67 X |
| 2,636,773 | 4/1953 | Van Tassel | 52/67 X |
| 2,732,251 | 1/1956 | Meaker | 52/67 X |
| 2,898,143 | 8/1959 | Ferrera | 52/143 X |
| 2,901,282 | 8/1959 | Merker | 296/23 C |
| 3,378,321 | 4/1968 | Frederick et al. | 312/215 |
| 3,390,493 | 7/1968 | Ruby | 52/67 X |
| 3,494,655 | 2/1970 | Linton | 296/23 C |
| 3,528,207 | 9/1970 | Howera | 52/67 |
| 3,653,165 | 4/1972 | West | 52/67 |
| 3,719,386 | 3/1973 | Puckett et al. | 52/67 |
| 3,745,725 | 7/1973 | Boucand | 52/67 |
| 3,866,365 | 2/1975 | Honigman | 52/71 X |

FOREIGN PATENT DOCUMENTS

| 1,129,557 | 1/1957 | France | 296/23 C |
| 576,847 | 3/1958 | Italy | 52/67 |
| 1,212,711 | 11/1970 | United Kingdom | 52/67 |

Primary Examiner—Leslie Braun
Attorney, Agent, or Firm—Kurt Kelman

[57] ABSTRACT

A mobile home is comprised of two telescopingly interconnected box-like parts, the main home part running on wheels while the extension part may be glidably moved between a transport position and an extended position. A pair of superposed pulleys is mounted on each side wall of the extension part at the inner end thereof and the lower pulleys cooperate with guide rails in the main part so that they may run as rollers along the rails for glidably moving the extension part with respect to the main part. A cable is trained over each pair of pulleys in zigzag arrangement and the end portions of the cables are anchored respectively at the open end and the opposite end wall of the main part, the cables being tensioned between the anchors in the zigzag arrangement. A force-transmitting connection is provided between the end portions anchored at the end wall and, if desired, both end portions of the cables may be interconnected to form an integral cable.

12 Claims, 5 Drawing Figures

MOBILE HOME

The present invention relates to improvements in the type of mobile home which comprises a box-like main part having two side walls and an end wall interconnecting the side walls, an end of the main part opposite to the end wall being open, a box-like extension part having two side walls and an end wall interconnecting the side walls, an end of the extension part opposite to the end wall thereof being received in the open end of the main part, a guide means in the main part for glidably guiding the extension part in the main part whereby the extension part may be telescopingly moved in the main part between a transport position and an extended position, and wheels supporting the main part for mobility of the home.

A mobile home of this general type has been disclosed, for example, in Austrian Pat. No. 174,543, published Sept. 15, 1952.

Whether a mobile home is constituted by a self-propelled vehicle or constitutes a trailer hitched to a vehicle, it is desirable for the home to have a minimum lengthwise dimension during transport, i.e. to take little space on the road in the transport position, while providing maximum living space when in use as a home, i.e. off the road. To accomplish this result, various means have been proposed to change the size of mobile homes, the above Austrian patent disclosing a telescoping two-part home involving a relatively complicated construction which requires difficult or at least time-consuming manipulations to convert the home between a transport and extended position.

U.S. Pat. No. 3,378,321, dated Apr. 16, 1968, discloses a filing cabinet wherein drawers are slidably mounted in a rigid cabinet which is stationary. During the sliding movement, the drawers are held balanced by a pair of tensioned cables extending along the side walls of the drawers and being trained in a zigzag arrangement over superposed pulleys at the inner ends of the drawers. The pulleys are associated with rollers cooperating with guide rails along which the rollers run during the controlled gliding movement.

It is the principal object of this invention to provide a mobile home which may be easily and readily converted from a transport into an extended position, and vice versa, while providing maximum living space in the extended position and taking up minimum space in the transport position. Concomitantly, it is an object of the invention to provide an exact and secure guide arrangement for moving the extension part of the home with respect to the wheeled main part thereof.

In a mobile home of the first indicated type, these and other objects are accomplished according to the present invention with a pair of superposed pulleys mounted on the vicinity of, i.e. no more than about 50 cm. from, each of the side walls of the extension part at the inner end thereof, with a lower one of the pulleys of each pair cooperating with the guide means and being constituted by rollers capable of running along the guide means for gliably moving the extension part with respect to the main part. A flexible tensile element is trained over each pair of pulleys in zigzag arrangement, and respective end portions of each of the tensile elements are respectively anchored in the region of vertical planes extending through respective ends of the guide means, the tensile elements being tensioned between the anchoring means in the zigzag arrangement. There is a force-transmitting connection between the end portions of the tensile elements anchored at the end wall of the main part.

In the transport position, the extension part is telescopingly moved into the main part of the home so that the length of the mobile home is essentially limited to that of the main part thereof. In the extended position, the extension part is gliably moved out of the main part, thus as much as doubling the length of the home and providing a maximum of living space therein. The guide arrangement, including the particular arrangement of the tensile element, makes it possible to pull out the extension part practically over the entire length of the guide means without requiring special supports or involving the risk of jamming. When the extension part is pulled out, the upper horizontal leg of the zigzag tensile element is lengthened the same distance as the lower horizontal leg thereof is shortened, the tensile element running over its two guide pulleys in the zigzag arrangement while the extension part is moved on the guide means. In other words, the entire length of the tensile element remains always constant and, in each position of the extension part, even when it has been practically entirely pulled out of the main part, readily manageable tensile forces in the tensile element balance the force of gravity acting upon the extended extension part so as to provide an equilibrium counteracting any torque on the extension part. In this manner, the extension part will always be held securely in the main part of the home without requiring complex guide means which tend to jam. Furthermore, since the lower pulleys have the form of rollers running on the guide means, a further structural simplification is achieved and the width of the home can be reduced, which is very important in mobile homes which are transported over highways where outsized loads are undesirable.

The above and other objects, advantages and features of this invention will become more apparent from the following detailed description of certain now preferred embodiments thereof, taken in conjunction with the accompanying drawing wherein FIG. 1 is a perspective view of one embodiment of a mobile home, with the extension part in a partially extended position;

Figure 1:
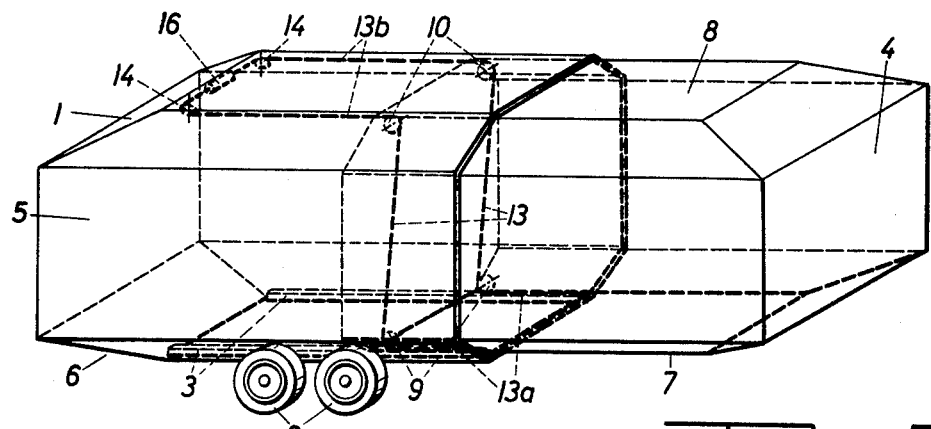

Referring now to the drawing and first to FIGS. 1 to 4, the mobile home of the invention is illustrated as a trailer home although it will be obvious to those skilled in the art that a drive motor may be mounted on main part 1 of the home to make it self-propelled without in any way changing the principles whereon the present invention is based and which will be explained in detail hereinafter.

As shown, the main part is box-like and has two side walls 5 and an end wall interconnecting the side walls, an end of main part 1 opposite to the end wall being open. Side walls 5 of main part 1 extend obliquely inwardly along a lower edge adjacent wheels 2 whereon the main part is supported for mobility, the recessed side walls defining space 6 wherein the wheels are arranged. This arrangement has the advantage that the full width of the main part of the home is available for living space while the wheels are housed in a recessed space and, therefore, the overall width of the home is not increased by the mounting of the wheels. Furthermore, the entire mobile home has a relatively low point of gravity since the wheels are mounted below the floor of the home, thus increasing the stability of the vehicle.

Box-like extension part 4 of the home also has two side walls, an end wall interconnecting the side walls, floor 7, roof 8 and an end opposite to the end wall thereof is received in the open end of main part 1. A guide means consisting of a pair of guide rails 3 is mounted in the main part for glidably guiding extension part 4 in main part 1 whereby the extension part may be telescopingly moved in the main part between a transport position and an extended position, a partially extended position of extension part 4 being shown in FIG. 1.

Figure 2:
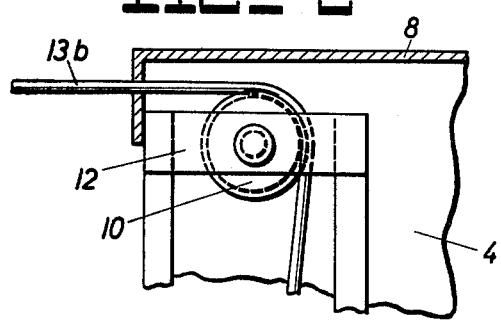
FIG. 2 is a side elevational view of the pulleys and tensile element in zigzag arrangement, together with the guide means for the extension part, the inner end of which is illustrated in vertical section.
Figure 3:
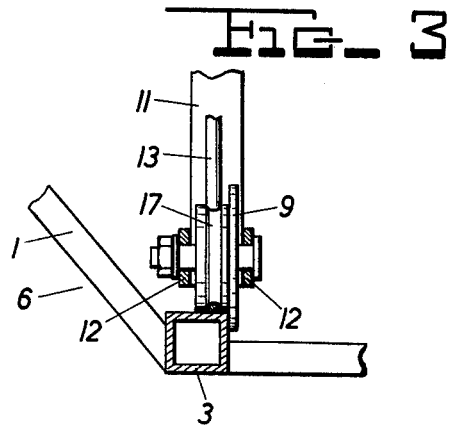
FIG. 3 shows an end view of a lower pulley-roller, with the guide means in vertical section.
Figure 4:
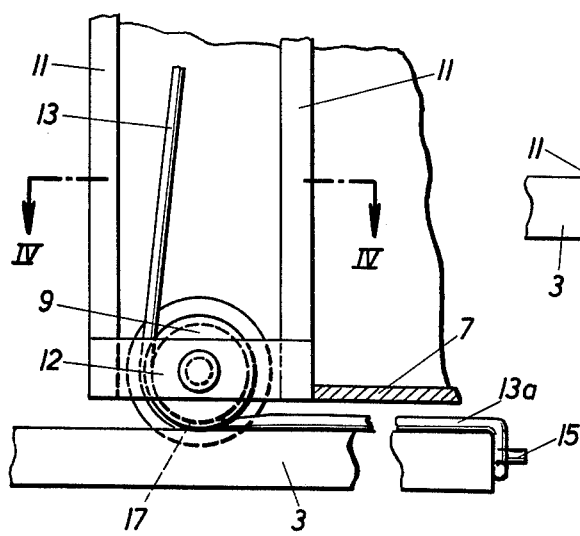
FIG. 4 shows a top view of FIG. 3, taken in a section along line IV—IV of FIG. 2.

As best shown in FIG. 2, a pair of superposed pulleys 9, 10 is mounted on each of the side walls of extension part 4 at the end thereof. The illustrated mounting arrangement comprises two uprights 11, 11 mounted between floor 7 and roof 8 of the extension part and two short connecting beams 12 between the uprights, the axles of pulleys 9 and 10 being journaled in the connecting beams and extending perpendicularly to the side walls. As best shown in FIGS. 3 and 4, lower pulley 9 of each pair cooperates with a respective guide rail 3 and is constituted by a roller capable of running along the guide rail for glidably moving the extension part with respect to the main part. The illustrated pulley rollers are flanged wheels, the flanges of which hold the wheels on guide rails 3 for movement therealong and whose running surfaces define annular grooves 17 whose hemispherical cross section approximates half the cross section of tensile element 13 which is thus guided and held in the groove. This is a space-saving arrangement as far as the width of the home is concerned since no extra space is required for a pulley and a guide roller in side-by-side arrangement.

In this arrangement, tensile element 13 runs over the pulley with the same diameter as that of the running surface of the flanged wheel. This is essential because, otherwise, different peripheral speeds may occur for the running of the flanged wheel over the guide rail and the rotation of the wheel in view of the relative movement between the extension part and the tensile element. This could cause jamming of the wheel and, thus, an unfavorable retention of the wheel on the rail or the tensile element on the wheel. There is no disadvantage in having the tensile element pressed firmly against the guide rail (see FIG. 3), particularly since extension part 4 is only relatively rarely moved into and out of the main part.

Flexible tensile element 13 is trained over each pair of pulleys 9, 10 in zigzag arrangement, as clearly shown in FIG. 2, the tensile element comprising upper horizontal leg 13b and lower horizontal leg 13a. Respective end portions of each tensile element are respectively anchored at the open end and the end wall of main part 1, the tensile element being tensioned between the anchoring means in the zigzag arrangement. The tensile element may be a stranded wire cable or any other suitable elongated flexible element capable of sustaining the required loads.

This illustrated anchoring means for the respective end portions of each tensile element comprise guide element 14, which is shown as a pulley having an axis extending parallel to side walls 5 of main part 1, i.e. perpendicularly to the axes of pulleys 10, and bolt 15 at the other end of guide rail 3. The end portions of tensile elements 13 anchored at guide elements 14 near the end wall of main part 1 are connected by a force-transmitting connection, the preferred connection shown herein being simply a connecting portion of the element between the two guide elements, which makes the tensile elements integral with each other, turnbuckle 16 being mounted in the connection portion for suitably tensioning the integral tensile element structure. The entire tensile element structure is formed into an endless element by training the end portions over bolts 15 at the ends of guide rails 3 opposite to the end wall of main part 1 and integrally connecting these end portions.

This preferred arrangement of an endless flexible tensile element provides an equilibrium at both sides of the home along which the zigzag portions of the tensile element extend, thus avoiding uneven tensile forces to be exerted at the respective sides and subjecting the main part of the home to torsion. By leading the tensile element to the rear end of guide rails 3, it is possible to pull extension part 4 out of main part 1 over the entire length of the guide rails.

Figure 5:
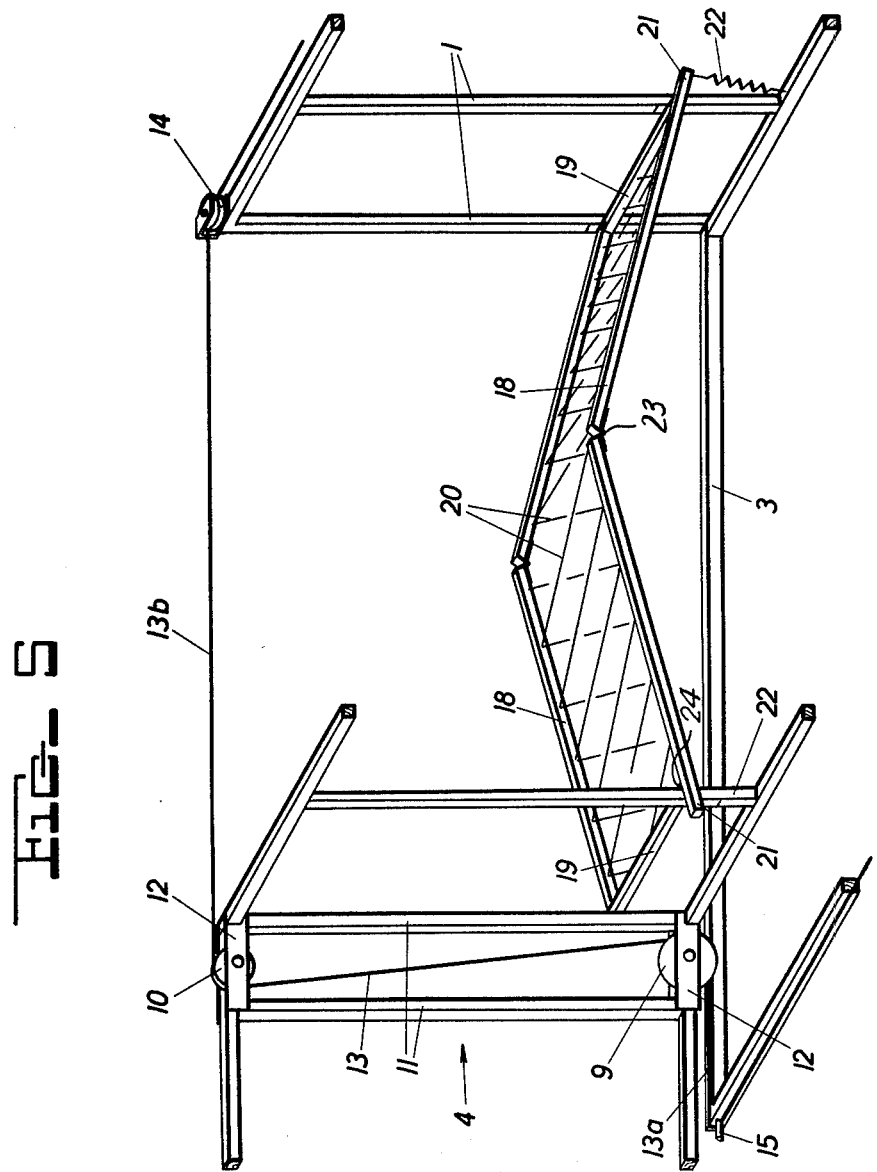
FIG. 5 shows a schematic, perspective view of a particular embodiment of a hinged connection between the main and extension parts of a mobile home.

FIG. 5 schematically illustrates a very useful embodiment wherein the end of extension part 4 opposite to the end wall thereof has pivoted thereto hinged strut 18 the other end of which is pivoted to main part 1 at one of side walls 5 thereof. The axes of hinge 23 of strut 18 and pivots 24 extend horizontally and perpendicularly to the side walls. As indicated by the illustrated partially extended position of extension part 4, hinged strut 18 extends horizontally in the fully extended position of the extension part and is pivoted into a folded position about hinge 23 thereof in the transport position when extension part 4 is fully telescoped into main part 1. Suitable stops hold the extended strut in its horizontal position. Such a hinged strut interconnecting the side walls of the extension and main parts of the home limits any lateral movement of the extension part in relation to the main part to a negligible amount determined by some unavoidable play in the pivots. At the same time, the strut supports the linear movement of the extension part when it is pulled out of the main part.

In the embodiment shown in FIG. 5, two such hinged struts 18 are provided, suitable uprights being mounted in the extension and main parts of the home to which the respective ends of the hinged struts are pivoted. Two additional, transverse struts 19 rigidly interconnect the parallel hinged struts 18 at the pivoted ends thereof to form a frame. The four struts of the frame support a wire net 20 so that the hinged frame constitutes a bed on which a mattress may be supported.

This hinged frame structure provides a highly stable interconnection between the telescoping parts of the mobile home and considerably improves the stability of the extension part in its extended position. It may be mounted near the floor or the roof, folding upwardly or downwardly about hinges 23, depending on its location. If mounted a sufficient distance from the floor to be able to serve as a bed frame, it provides a bed which is ready for use in its horizontal, extended position and takes up very little room when folded upright near the end wall of the main part when in the transport position of the home. It is possible to mount two such frames at respective sides to provide two beds, or to mount two superposed bed frames to provide bunk beds if the box-like parts of the home are high enough. This makes it possible to convert the main part of the home into a bedroom in the extended position, without requiring additional furniture to be stored in the extension part.

If desired, the hinged struts may have conduit bores along the length thereof to accommodate electric wires and/or water and gas ducts, as may be desired, in which case the struts are tubular.

As illustrated, one of the hinged struts has extension 21 beyond the pivoted ends thereof and biasing tension spring 22 is connected between the strut extensions and main part 1 and extension part 4, respectively. The springs act upon the strut extensions and tend to pivot hinged strut 18 about hinge 23, thereby facilitating the pivoting and making it easier to move the extension part into and out of the main part.

What I claim is:

1. A mobile home comprising
   (a) a box-like main part having two side walls, a floor and an end wall interconnecting the side walls, an end of the main part opposite to the end wall being open,
   (b) a box-like extension part having two side walls, a rigid floor and an end wall interconnecting the side walls, an end of the extension part opposite to the end wall thereof being received in the open end of the main part,
   (c) a guide means in the main part for glidably guiding the extension part in the main part whereby the extension part may be telescopingly moved in the main part between a transport position and an extended position,
   (d) wheels supporting the main part for mobility of the home,
   (e) a pair of superposed pulleys mounted in the vicinity of each of the side walls of the extension part at the end thereof,
      (1) a lower one of the pulleys of each pair cooperating with the guide means and being constituted by rollers capable of running along the guide means for glidably moving the extension part with respect to the main part,
   (f) a flexible tensile element trained over each pair of pulleys in zigzag arrangement,
   (g) means for anchoring respective end portions of each of the tensile elements respectively in the region of vertical planes extending through the respective ends of the guide means, the tensile elements being tensioned between the anchoring means in the zigzag arrangement, and
   (h) a force-transmitting connection between the end portions of the tensile elements anchored near the end wall of the main part and forming the tensile elements into an endless element, each end portion being immovably connected to the force-transmitting connection.

2. The mobile home of claim 1, wherein the force-transmitting connection between the tensile elements comprises a connecting portion which makes the tensile elements integral with each other and a turnbuckle at the connecting portion, the anchoring means near the end wall being comprised of guide elements having axes extending perpendicularly to the axes of the pulleys.

3. The mobile home of claim 2, wherein the axes of the pulleys extend perpendicularly to the side walls and the axes of the guide elements extend parallel thereto.

4. The mobile home of claim 1, wherein the lower pulleys are flanged wheels having running surfaces defining annular grooves whose cross section approximates half the cross section of the tensile elements.

5. The mobile home of claim 1, wherein each of the tensile elements is guided about the anchoring means at the end of the guide means opposite the end wall of the main part, the end portions of the tensile elements guided about the anchoring means being integrally interconnected.

6. The mobile home of claim 1, wherein the side walls of the main part are recessed along a lower edge adjacent the wheels, the recessed side walls defining a space wherein the wheels are arranged, the guide means being mounted adjacent the recessed side walls.

7. The mobile home of claim 1, wherein the wheels support the main part for mobility of the home in the direction of the guide means whereby the extension part may be telescopingly moved in said direction.

8. The mobile home of claim 1, further comprising a hinged strut having respective ends pivoted to the end of the extension part and to the main part at one of the side walls above the floors, the axes of the hinge and pivots extending perpendicularly to the side walls, the hinged strut extending horizontally in the extended position of the extension part and being pivoted about the hinge thereof in the transport position.

9. The mobile home of claim 8, comprising two of said hinged struts extending parallel to each other and further comprising two additional struts rigidly interconnecting the hinged struts at the pivoted ends thereof, the four struts forming a frame.

10. The mobile home of claim 8, wherein the hinged struts define conduit bores along the length thereof.

11. The mobile home of claim 8, wherein the hinged strut has an extension beyond at least one of the pivoted ends thereof, and further comprising a biasing means tending to pivot the hinged strut about its hinge, the biasing means acting upon the strut extension.

12. The mobile home of claim 7, wherein the wheels support the main part for mobility of the home in the direction of the guide means whereby the extension part may be telescopingly moved in said direction.

* * * * *